United States Patent
Tunguz-Zawislak (10) Patent No.: US 8,712,985 B1
(45) Date of Patent: *Apr. 29, 2014

(54) SOCIAL NETWORK USER DATA ADVERTISING

(71) Applicant: Google Inc., Mountain View, CA (US)

(72) Inventor: Tomasz J. Tunguz-Zawislak, San Francisco, CA (US)

(73) Assignee: Google Inc., Mountain View, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/762,661

(22) Filed: Feb. 8, 2013

Related U.S. Application Data (63) Continuation of application No. 11/969,453, filed on Jan. 4, 2008, now Pat. No. 8,380,691.

(51) Int. Cl.
*G06F 17/00* (2006.01)

(52) U.S. Cl.
USPC .......................................... 707/705

(58) Field of Classification Search
USPC .......................................... 707/705
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,396 A | 12/1998 | Gerace | |
| 5,848,397 A | 12/1998 | Marsh et al. | |
| 5,948,061 A | 9/1999 | Merriman et al. | |
| 6,026,368 A | 2/2000 | Brown et al. | |
| 6,044,376 A | 3/2000 | Kurtzman | |
| 6,078,914 A | 6/2000 | Redfern | |
| 6,144,944 A | 11/2000 | Kurtzman et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,985,882 B1 | 1/2006 | Del Sesto | |
| 7,039,599 B2 | 5/2006 | Merriman et al. | |
| 7,136,875 B2 | 11/2006 | Anderson et al. | |
| 7,676,467 B1 | 3/2010 | Kozyrczak et al. | |
| 2004/0059708 A1* | 3/2004 | Dean et al. | 707/1 |
| 2006/0282328 A1 | 12/2006 | Gerace et al. | |
| 2007/0239534 A1* | 10/2007 | Liu et al. | 705/14 |

FOREIGN PATENT DOCUMENTS

WO  WO9721183 A1  6/1997

OTHER PUBLICATIONS

AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org, Apr. 12, 1997 and Feb. 1, 1997.
Baseview Products, Inc., AdManagerPro Administration Manual v. 2.0, Dec. 1998.

(Continued)

*Primary Examiner* — Belix M Ortiz Ditren
(74) *Attorney, Agent, or Firm* — Fish & Richardson P.C.

(57) ABSTRACT

Data is received from a social networking system, the data including user data and performance data associated with one or more user pages in the social networking system. A query is received specifying desired user data and performance data. A performance group is generated including user data and performance data of user pages responsive to the query.

20 Claims, 6 Drawing Sheets

(56) References Cited

OTHER PUBLICATIONS

Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.

\* cited by examiner

SOCIAL NETWORK USER DATA ADVERTISING

CROSS-REFERENCE TO RELATED APPLICATIONS

This application is a continuation of and claims priority to U.S. patent application Ser. No. 11/969,453, titled "SOCIAL NETWORK USER DATA ADVERTISING," which was filed on Jan. 4, 2008. The disclosure of the foregoing application is incorporated herein by reference in its entirety.

FIELD

This disclosure is generally related to social networking systems.

BACKGROUND

Online social networks have become popular for professional and/or social networking. Users of online social networks typically include a large amount of personal data in user profiles describing likes, interests, friends, etc. Targeted advertisements may also be displayed in the user profiles. These advertisements are typically targeted using keywords found in the user profile. For example, an advertisement for cat food may be displayed on a user profile page that included the keyword "cat". However, targeting advertisements based solely on keywords alone can be problematic, especially when user profiles provide so much data with which to target advertisements. For example, targeting on keywords alone may not take into account the performance of an advertisement selected based on a keyword. Accordingly, the targeting of advertisements to users that typically ignore such advertisements may not be an effective use of advertising resources.

SUMMARY

In one general aspect, data is received from a social networking system, the data including user data and performance data associated with one or more user pages in the social networking system. A query is received specifying desired user data and performance data. A performance group is generated including user data and performance data of user pages responsive to the query.

Implementations may include one or more of the following features. The performance data associated with a user page may include performance data of advertisements displayed on the user page. The performance data may include a click-through rate, a conversion rate, and an impression rate. The performance data may be associated with a vertical.

In another general aspect, a target demographic for an advertisement is determined. A query is generated based on the target demographic, the query specifying desired user data and performance data. Social networking system data is queried for user pages in the social networking system responsive to the query. A performance group of social networking system data is received. The social networking system data includes user data and performance data of user pages responsive to the query. An advertisement is associated with user pages responsive to the query.

Implementations may include one or more of the following features. The advertisement may be associated with the user pages such that when one of the user pages is presented by the social networking system the advertisement is also presented. The advertisement may be associated with the user pages such that when a user associated with one of the identified user pages is presented with a user page by the social networking system the advertisement is also presented. The performance group may be sold or auctioned.

In another general aspect, a performance group identifying one or more user pages of a social networking system is generated. The performance group including user data and performance data of the identified user pages. The performance of advertisements displayed on the user pages identified by the performance group is monitored. Statistics describing the performance of advertisements displayed on the user pages identified by the performance group are generated. An identifier of the generated performance group along with the generated statistics is displayed.

Implementations may include one or more of the following features. The generated performance group may be sold or auctioned. The performance group may be generated by identifying a target demographic, determining user and performance data indicative of the target demographic, querying a database of social networking system user data and performance data using the determined user and performance data, and receiving a performance group identifying one or more user pages of the social networking system responsive to the query.

Monitoring the performance of advertisements displayed on the user pages identified by the performance group may include monitoring the click-through rate for advertisements displayed on the user pages identified by the performance group. Advertisements may be associated with a vertical, and monitoring the performance of advertisements displayed on the user pages identified by the performance group may include monitoring a vertical and the click-through rate for advertisements associated with the vertical displayed on the user pages identified by the performance group.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
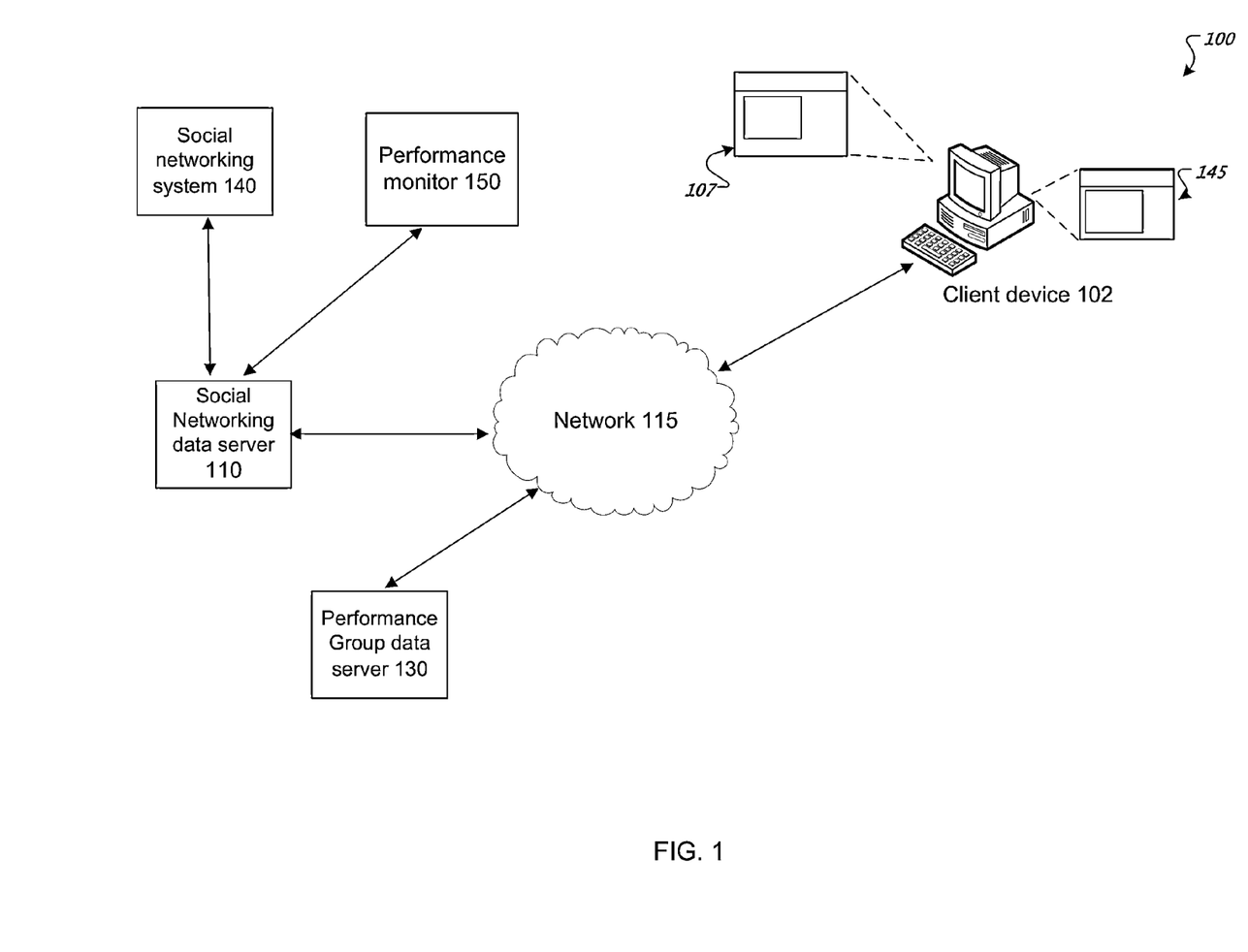
FIG. 1 is an example system for generating user performance groups using social networking system data.

FIG. 1 is an example system 100 for generating user performance groups using social networking system data. Social networking systems are generally web based applications that provide a multitude of ways for users of the social networking systems to interact, such as messaging, email, video, chat, file sharing, blogging, discussion groups, and so on. Popular social networking systems include Orkut™, hosted by Google, Inc., of Mountain View, Calif., for example. Users of social networking systems come from a variety of diverse backgrounds and interests and may include adults, students, artists, corporations, and social causes, for example.

Users of social networking systems typically create a user page that may include personal information about the user. Typical information may include the user's personal tastes in music and food, occupation, as well as the user's age or hometown. The page may also contain links to other user pages that the user has associated themselves with. For example, a user may provide links to the user pages of the user's friends in the social network, or may provide links to user pages associated with artists, products, or causes that the user enjoys or supports.

Many users of social networking systems use their user page like a personal web page. Users may frequently update their user pages to reflect their current moods, interests, or location. The users may also include an online diary, or blog, where they may publish content to other users of the social networking system, or the general public, for example.

Further, many users of social networking systems use the systems for communicating with other users of the social networking system. For example, many users may use embedded chat applications (either text, voice, or video) to communicate with other users of the social networking system. They may leave public messages for specific users, private messages for specific users, or broadcast messages to all users or a subset of users from their personal network.

Because of the large amount of data generated by users through their personal user pages, as well as time spent working on their personal pages and communicating to other users, social networking data can be a useful tool in a system for the targeting of advertisements. Such a system that facilitates the targeting of such advertisements is shown in system 100 of FIG. 1.

The system 100 includes a social networking data server 110. The social networking data server 110 stores social networking user data from one or more social networking systems 140. The social networking data may be stored in a database, or other storage device. In some implementations, the social networking data may be provided directly from the social networking system 140. For example, the social networking system provider may periodically send or provide a file containing social networking data retrieved from the social networking system 140. In other implementations, the social networking user data may be gathered from the social networking system 140 by an automated data collection program. For example, the social networking data may be collected by a spider application commonly used to collect data from the Internet by search engines.

The social networking user data may include user data for some or all of the profiles or user pages in the social networking system. User data may include data that is provided by the users on their user page (e.g., interests, profile, blog, etc.), data provided by friends of the user (e.g., comments, messages, etc.), and usage data (e.g., last time the user logged in, last time user updated their profile or blog, etc.). For privacy reasons, the social networking system provider may allow users to opt-out, or request that their user page not be included in the user data stored at the social network user data server 110. Further, user data that may be used to identify a particular user of the social networking system may be removed, encrypted, or otherwise obscured to protect the privacy of social networking system users.

The social networking data server 110 may further include performance data for one or more of the user pages received from a performance monitor 150. The performance monitor 150 can be a software entity running on any one of the social networking system 140, the social networking data server 110, or the performance group data server 130, or may be a separate server implementation that monitors the performance of advertisements. Performance data may include data that describes the performance or effectiveness of advertisements displayed on the user pages in the social networking system 140. For example, user pages in social networking systems typically include space for one or more advertisements. These advertisements are viewed both by viewers of a particular user page and the user associated with the user page (e.g., while updating the user page, viewing comments left by friends, using embedded chat or communications applications, etc.). Examples of such metrics include click-through rate (number of times an advertisement is selected/number of times it is displayed), impression rate (number of times advertisements are shown on a user page/time), and conversion rate (number of times a click-through of an advertisement results in a goal being achieved (e.g., a purchase)).

The performance data may also include verticals or categories associated with advertisements that have been displayed on the user pages along with the performance for that vertical. For example, the performance data collected for a particular user page may contain the click-trough rate, impression rate, and conversion rate for a variety of different advertisement verticals, including advertisements related to sports, consumer goods, charitable causes, etc.

The social networking data server 110, may receive and process queries from one or more client devices 102. The client device 102 may include a general purpose computer connected to the social networking data server 110 through a network 115. The network 115 may include a variety of public and private networks such as a public-switched telephone network, a cellular telephone network, or the Internet, for example.

In some implementations, a user of the client device 102 may be an advertiser. The advertiser may wish to target one or more users of the social networking system 140 with advertisements. Accordingly, the user of the client device 102 may generate and send a query to the social networking data server 110 through the network 115. The query may specify desired performance data, user data, or some combination of both, describing a desired demographic or profile for targeted advertisements. The query may further contain additional search parameters such as Boolean operators, for example.

The social networking data server 110 may process the query by retrieving user data and performance data for user pages matching the query. User data and performance data for user pages matching the query is referred to as a "performance group". The performance group may be constructed using a variety of data structures, such as XML, for example. The performance group may include some or all of the user data and performance data collected for one or more user pages in the performance group, however, the actual user identifiers and other information that may be used to identify the users may be obscured, removed, or encrypted to protect the privacy of the users.

The user of the client device 102 may enter the query using an interface 107. In some implementations, the interface 107 may be part of a web based application implemented in a programming language such as Ruby on Rails, for example. The application may be executed on the social networking data server 110, or on another computer. In other implementations, the interface 107 may be part of an application executing on the client device 102 that provides the query to the social networking data server 110. The application may be created using an application programming interface (API) that allows developers to design applications that interact with social networking data, such as OpenSocial™ by Google, Inc., for example.

The user of the client device 102 may desire to obtain a performance group that contains data related to user pages of the social networking system that have authors who show an interest in kayaking, have updated their user page in that last five weeks, are not married, and meet one or more advertisement performance criteria for advertisements displayed in their profile.

Examples of such advertisement performance criteria may include a click-through rate of greater than 2% for advertisements in the kayaking vertical or the sports vertical. Other criteria may include a conversion rate greater than 0.1%, for example. The user of client device 102 may use the interface 107 to construct a suitable query. The user may construct the query by selecting one or more user and performance data fields and providing desired values or terms for each field. The user may further define how those fields are processed by including Boolean operators such as AND. NOT, and OR, for example. The interface 107 may further allow the user to submit their query using a natural language search.

The social networking data server 110 may receive the query and process the query by generating a performance group of user data and performance data for user pages responsive to the query. The performance group may contain an identifier of each user page in the performance group, along with the user data and performance data associated with that user page in the social networking data server 110.

Continuing the example described above, the social networking data server 110 generates a performance group that includes user data and performance data responsive to the request for user pages of users that are interested in kayaking, have updated their profile in that last five weeks, are not married, and meet the provided advertisement performance criteria. In some implementations, the performance group contains identifiers that correspond to unique users of the social networking system. However, the identifiers may be encrypted or otherwise obscured such that a recipient of the performance group is not able to identify the actual person or entity corresponding to a particular user page identified in the performance group. In other implementations, the performance group may additionally include some or all of the collected user and performance data for the user pages identified by the performance group.

The generated performance group may be sent to a performance group data server 130. The performance group may be sent to the performance group data server 130 through the network 115, for example.

The performance group data server 130 may store the performance group along with a generated performance group id that uniquely identifies the generated performance group. The performance group id may then be used to later request and retrieve the performance group.

The performance group data server 130 may provide the performance group to the client device 102. In some implementations, the performance group data server 130 may send the generated performance group id rather than, or in addition to, the performance group itself. The performance group may be sent by the performance group data server 130 to the client device 102 through the network 115.

A user of the client device 102 may view the performance group using the interface 145. The user may use the interface 145 to view various details of the performance group, as well as associate one or more advertisements with the user pages identified by the performance group. For example, continuing the example described above, the generated cluster identifies user pages of users of the social networking system that are interested in kayaking, have updated their profile in that last five weeks, are not married, and meet one or more advertisement performance criterion for advertisements displayed in their profile. The advertiser may contract with the social networking system, or other advertisement delivery system, to provide a targeted advertisement to the user pages identified in the performance group.

The social networking system 140, the performance monitor 150, the social networking data server 110, and the performance group data server 130 may be each implemented on single computer systems, or as a distributed computer system comprising multiple computers (e.g., a server farm). In addition, two or more of the social networking system 140, the performance monitor 150, the social networking data server 110, and the performance group data server 130 may be implemented as components of the same computer or as components of a distributed computer system.

Figure 2:
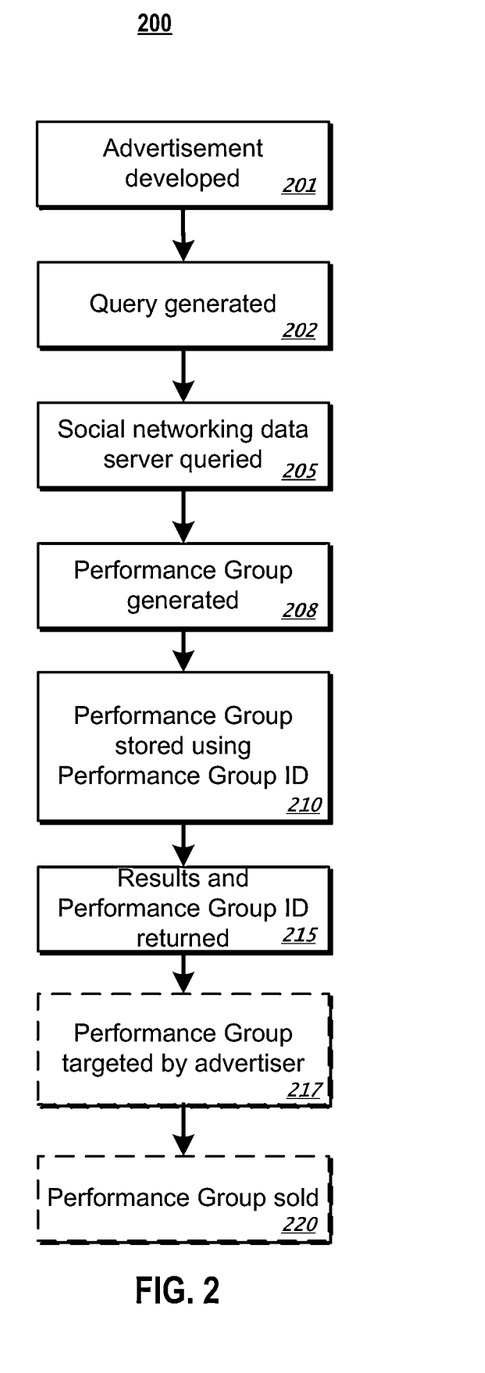
FIG. 2 is a flow diagram of an example process flow for generating a user performance group using social networking system data.

FIG. 2 is a flow diagram of an example process flow 200 for generating a user performance group using social networking system data. An advertiser develops one or more target advertisements for a social networking system (201). The advertiser may desire to target an advertisement to a group or demographic of users of the social networking system. As described in FIG. 1, users of social networking systems provide a large amount of personal information in their user pages or profiles. For example, user pages often contain lists of user likes and dislikes, user maintained blogs, as well as comments posted by other users of the social networking system. This user data may be collected and stored at the social networking user data server 110 along with performance data describing the performance of advertisements displayed on the user pages, for example.

The advertiser may utilize the user data and performance data associated with the social networking system user pages to identify performance groups of user pages that may be visited by users interested in the product being promoted by the advertiser. The advertiser may maximize the performance of their targeted advertisements by presenting the advertisements at user pages in the identified performance group.

For example, an advertiser may be promoting a new flavor of soda targeted to college students. The advertiser may desire to promote the soda on user pages of a social networking system that show an interest in soda or fast food, and are maintained by college students. The advertiser may further wish to advertise only on user pages that have met some advertisement performance metric, such as a click-through rate of greater than 2% for advertisements previously displayed. The advertiser may design an advertisement promoting the soda to be displayed in the portion of the social networking system user pages reserved for advertisements on the user pages meeting the described criteria.

The advertiser generates a query to target a desired audience or demographic (202). After determining a desired audience, the advertiser may generate a query that captures, or attempts to capture, the desired user demographic. The user may generate the query using an interface 117, for example.

The generated query may be a Boolean search including provided values for fields corresponding to various user data and performance data collected from and about user pages in the social networking system. The data for these fields may have been provided by the social networking system, or where the user pages are publicly accessible, collected by an Internet spider, for example.

The performance data fields may correspond to advertising related data that may have been collected about the user pages. The collected performance data may describe the overall performance of past advertisements shown on a particular user page. For example, the performance data may include overall click-through rates, impressions, and conversions for advertisements displayed on the user pages. In addition, the performance data may be provided for different verticals of displayed advertisements. For example, the click-through rate for advertisements related to cooking, fishing, gardening, or other verticals may be available. Further, the performance data may be specific to various time frames, such as a click-through rate for the last day, month, or year.

Continuing the soda advertisement example described above, the advertiser may generate a query attempting to capture the desired demographic of college students having an interest in soda. The advertiser may select that the user data fields corresponding to education indicates the term "college" or "university". Additionally, the advertiser may specify that one of the user data fields related to user interests or blogs contain a reference to soda or some type of soft drink. In some implementations, known synonyms or variants of a provided term may be automatically provided for the query. For example, when the user provides the term soda, the terms pop, coke, and seltzer may automatically be included in the query terms.

The advertiser may select some performance data fields to further refine the query. As described above, the advertiser may only wish to target advertisements to user pages where the click-through rate is greater than 2%. Accordingly, the advertiser may include one or more performance data fields in the generated query specifying the desired click-through rate.

The social networking data server 110 is queried using the user generated query (205). In some implementations, the query is sent to the social networking data server 110 by an application generated using a social networking system data API. The application may be executed on a client, such as the client device 102, or the application may be executed remotely on the social networking data server 110, or some other server. In some implementations, the application may be implemented using SOAP, and the client device 102 transmits the query using HTTP or HTTPS, for example.

A performance group responsive to the query is generated (208). The social networking data server 110 may generate the performance group according to the provided query. The query may be in the form of an SQL statement, or other database language, for example.

In some implementations, the generated performance group contains some or all of the user and performance data fields associated with user pages that match the query. In other implementations, the performance group contains only user ids. Further, some or all information that could be used to personally identify the owner of a particular user page may be removed, obscured, or encrypted to protect user privacy. The performance group may be implemented using a variety of data structures, including, but not limited to, XML.

The performance group is stored using a performance group id (210). The performance group may be stored in a database, such as the performance group data server 130 and indexed by performance group id, for example.

The performance group or performance group id is returned to the requesting advertiser (215). In some implementations, the entire performance group, or some portion of the performance group, may be returned to the requesting advertiser. In other implementations, the advertiser may receive only the performance group id or a link or pointer to the performance group in the performance group data server 130, for example.

The advertiser may target the users pages associated with the performance group for advertisement purposes (217). Continuing the example described above, the advertiser has generated a performance group including user pages that correspond to a desired demographic of a social networking system. In some implementations, the advertiser may contract, either with a third-party or an owner of the social networking system, to have an advertisement displayed when a user page in the performance group is requested or displayed. The advertiser may further contract that the advertisement be displayed to a user associated with a user page in the performance group when the user requests a user page, regardless of whether or not the requested user page is in the performance group. The advertiser may make payments to the third party or owner of the social networking system according to a variety of schemes including a flat fee based on the size of the performance group, a rate based on the number of times the advertisement is shown (i.e., impressions), or a rate based on the number of times the advertisement receives a click (i.e., click-through rate). Further, the payments may be based on the quality or overall desirability of the performance group taking into account the contents of the user and performance data associated with the user pages in the performance group. For example, a performance group identifying user pages with a click-through rate of 10% may be more desirable than a performance group identifying user pages with a click-through rate of 1%.

The advertiser may further sell or license the generated performance group to other advertisers (220). For example, the demographics associated with the generated performance group may be applicable to a larger variety of products than just soda. The advertiser may then sell or license other advertisers the generated performance group. The advertiser may sell a performance group using an auction as described with respect to FIGS. 4, and 5, for example.

Figure 3:
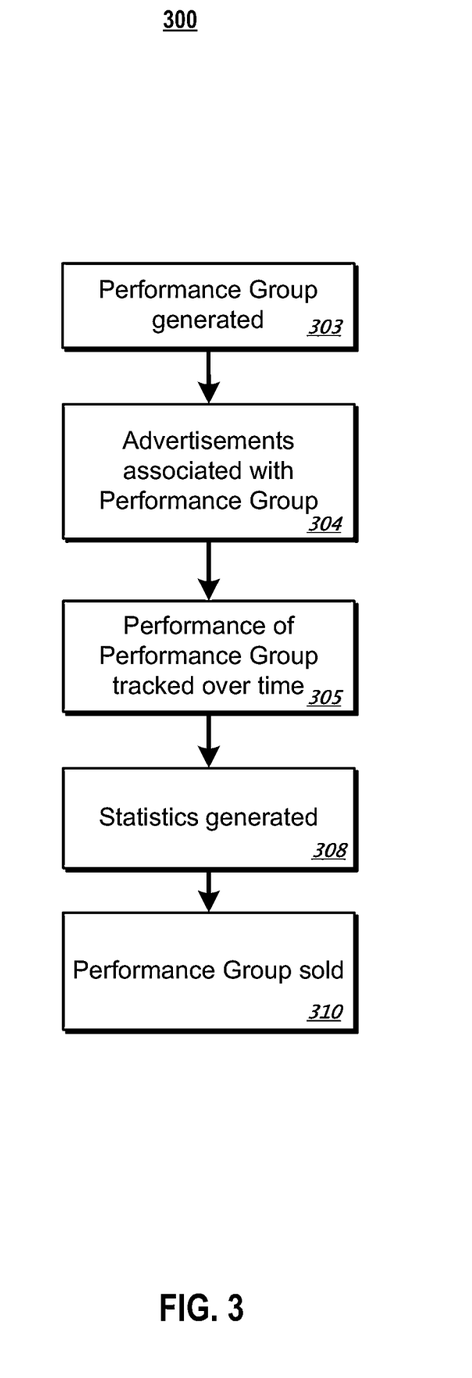
FIG. 3 is a flow diagram of an example process flow for measuring the performance of a user performance group with respect to advertisements.

FIG. 3 is a flow diagram of an example process flow 300 for measuring the effectiveness of a user performance group with respect to advertisements. An advertiser may purchase or create a user performance group (303). As described with respect to FIGS. 1 and 2, the advertiser may generate a performance group identifying social networking system user pages to target a desired audience or demographic for advertisement purposes.

The advertiser associates one or more advertisements with the generated performance group (304). The advertiser associates one or more advertisement with the user pages identified in the performance group, such that when a user page identified in the performance group is presented, one of the one or more advertisements is desirably presented to the requestor or viewer. In some implementations, the one or more advertisements may also be presented to users associated with user pages identified by the performance group when viewing user pages not part of the performance group. Presenting advertisements to the authors or owners of these pages may be effective because the authors created their respective user pages, and may therefore be responsive to the targeted advertisements.

For example, a first user may have created a user page in the social network that is included in a performance group identifying user pages that show an interest in horses. When the first user views the page of a second user whose page shows an interest in cats, displaying an advertisement targeted to horses to the first user on the second user's page may result in greater success than displaying an advertisement related to cats.

The performance of the of the performance group is tracked over a period of time with respect to one or more advertisements (305). While a performance group was generated to capture a particular demographic, and therefore, increase the performance of targeted advertisements with respect to that demographic, the performance group may not be successful for a variety of reasons. For example, the targeted group may not respond to the types of advertisements presented.

Further, a particular performance group may be effective with respect to advertisements that it was not originally generated to target. For example, a performance group generated to target kayakers may also be very effective for targeting advertisements related to movies. Accordingly, a variety of data may be collected regarding the performance of the performance group with respect to different advertisements and advertisement verticals or categories, including, but not limited to click-through rate, impression rate, and conversion rate for example.

Statistics concerning the performance of the performance group are generated (308). Various performance metrics may have been collected for the performance group with respect to one or more advertisements and advertisement verticals or categories. Statistics describing the performance of the performance group with respect to the one or more advertisements may be generated using the metrics.

For example, over a period of one year five different targeted advertisements corresponding to five different verticals may have been displayed on user pages in a cluster, as well as to users associated with the user pages in the clusters. Example statistics generated for the cluster over the year may include: the click-through rate, and convergence rate for each of the five verticals and for a variety of time frames and dates (e.g., one day, one week, one year) for both users associated with the user pages and viewers of the user pages; and the average number of hits or impressions made on the user pages for a variety of time frames and dates.

The performance group is put up for sale (310). The performance group may be sold by auction or purchased directly for an established price. The performance group may be sold through an interface 400, as described with respect to FIG. 4, for example.

Figure 4:
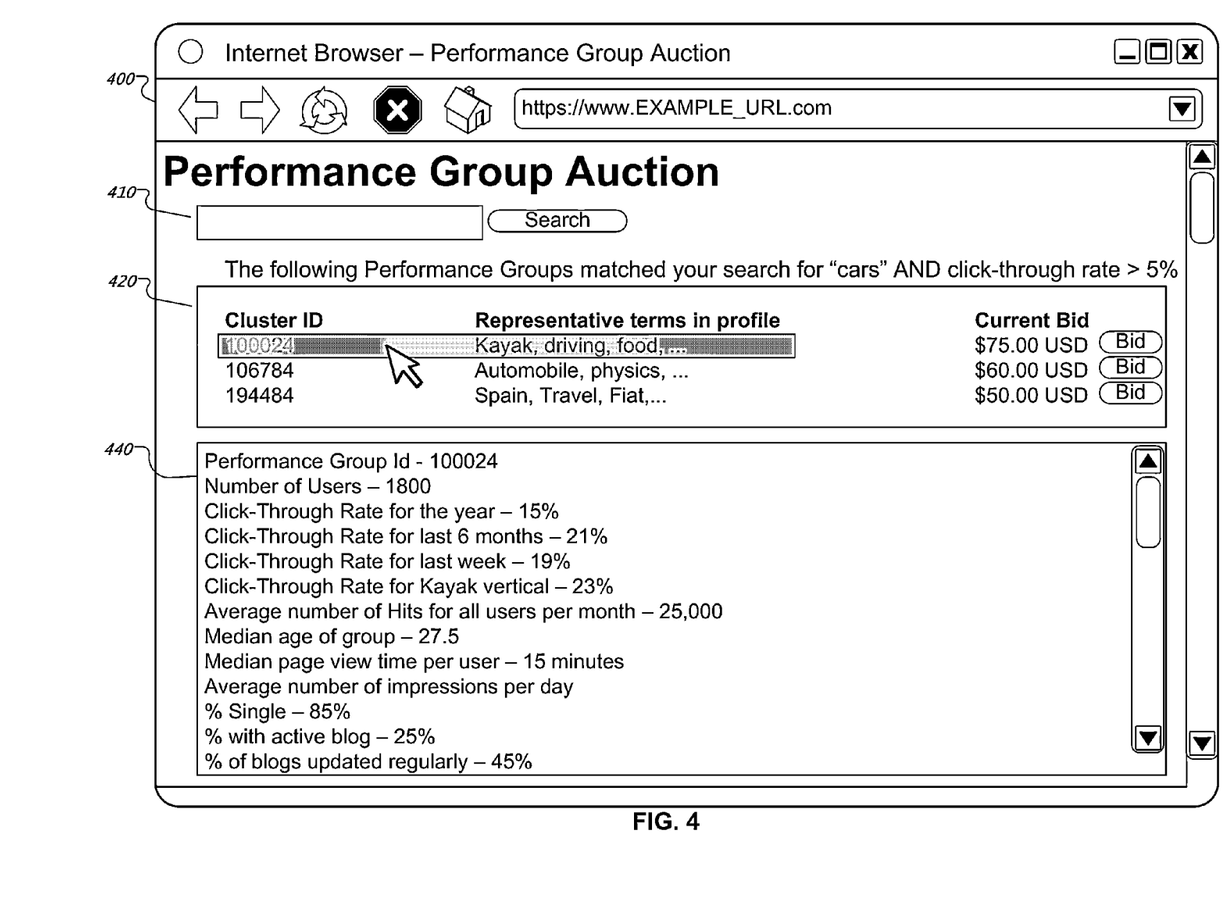
FIG. 4 is an example user interface for purchasing social networking system performance group data.

FIG. 4 is an example user interface 400 for purchasing social networking system performance group data. The user interface 400 allows a purchaser to browse for performance groups of social network application users to target for advertisements. The performance groups may been generated using systems and methods described with respect to FIGS. 1 and 2, for example. As shown, the user interface 400 is implemented using an internet browser. However, the interface 400 can be implemented using a variety of methods or techniques including implementation as a stand-alone software application, for example.

The interface 400 includes a search box 410. In order to allow a purchaser to view available performance groups that are relevant to a demographic that the purchaser is targeting, the user interface 400 may provide for the ability for the purchaser to search for relevant performance groups. In some implementations, the purchasers may search for performance groups using the various user and performance data fields associated with the user pages contained in the performance groups. In other implementations, the purchasers may search by relevant terms and descriptions of the performance groups provided by the sellers of the performance groups. In still other implementations, the purchasers may browse available performance groups by associated categories or demographics. In the example illustrated in FIG. 4, a purchaser has searched for performance groups related to the term "cars" and having a click-through rate greater than 5%.

The interface 400 may also include a performance group results window 420. The window 420 may display one or more of the performance groups responsive to a user search or selection. Responsive performance groups may be displayed by name, performance group id, etc. Further, some additional optional information may be displayed such as data from various user or performance data fields, a description provided by the seller, and a current price or high bid, for example.

In the example illustrated in FIG. 4, three matching performance groups are shown including their performance group id, some representative terms or phrases from the user data fields, and a current bid for the performance group.

The interface 440 may further include a performance group details window 440. The window 440 may provide additional details regarding the contents of a selected performance group and may include the generated statistics described above with respect to FIG. 3. In the example shown, the purchaser has selected to receive additional information regarding performance group 100024. Various data and statistics describing the performance group are shown in window 440, including, but not limited to: the performance group id; the number of users in the performance group; click-through rates, impression rates, and conversion rates for various time frames and verticals; average hits per month for pages in the performance group; a median age for users in the performance group; a median page view time per user; the average number of impressions made though the pages per day; the percentage of the users who are single; the percentage of users who have active blogs; and the percentage of users that update their blogs regularly, for example.

Figure 5:
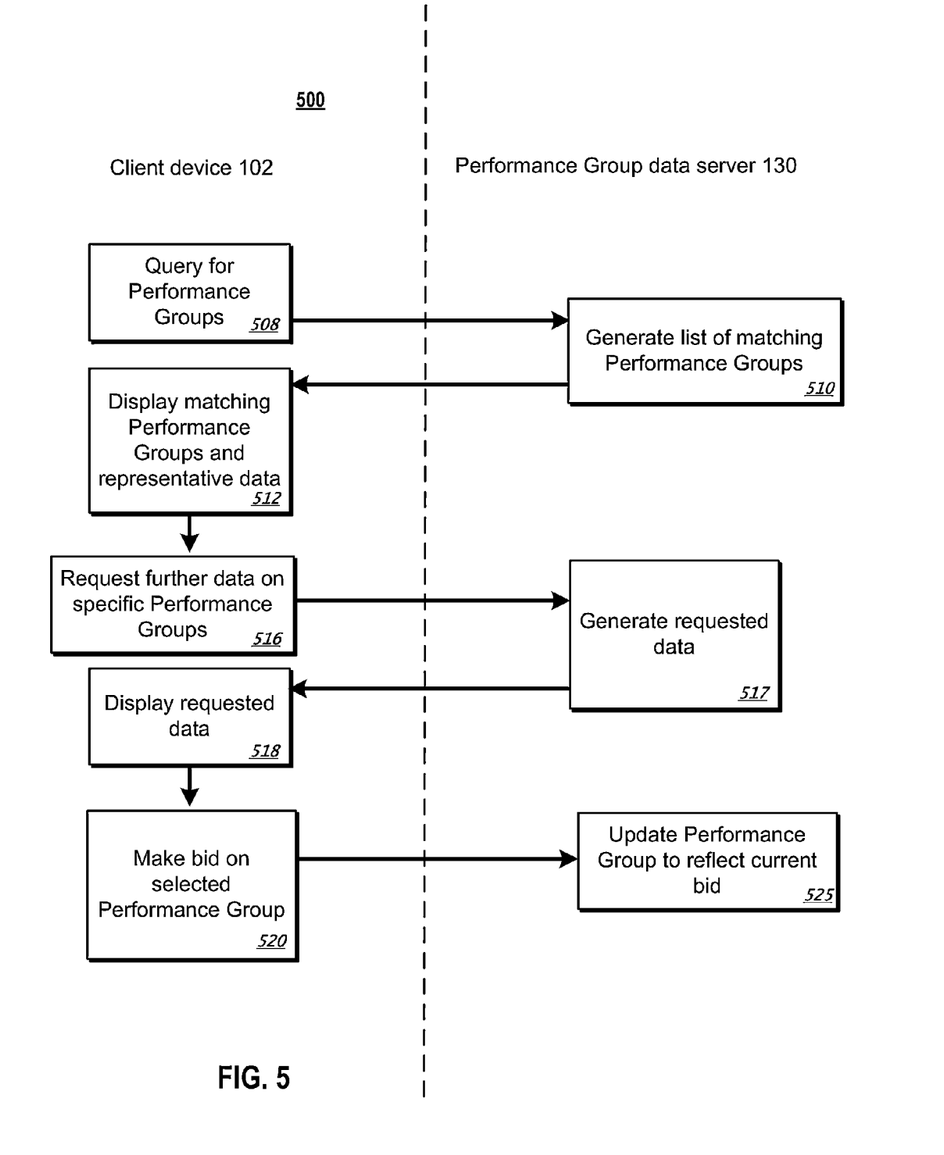
FIG. 5 is a flow diagram of an example process flow for purchasing a user performance group.

FIG. 5 is a flow diagram of a process 500 for the bidding on, or purchasing of, user data performance groups. The process 500 may be implemented using a combination of computer devices, including the client device 102 and performance group data server 130, for example.

A query is made for one or more performance groups (508). A purchaser may use the client device 102 to query the performance group data server 130 for one or more available performance groups. In some implementations, the purchaser may generate the query using an interface 400. The purchaser may construct the query by supplying values for one or more selected user and performance data fields. In other implementations, the user may browse from a list of available queries, for example.

A list of performance groups matching the query is generated (510). The performance group data server 130 may receive the query from the client device 102 and generate a list of user performance groups that are available for purchase. In implementations where the purchaser provides one or more desired user and performance data, the matching performance groups may be generated by searching the performance group data server 130 using the provided user and performance data.

The matching performance groups are presented along with representative data (512). The list of matching performance groups are provided by the performance group data server 130 and presented to the purchaser at the client device 102. In some implementations, the performance groups are presented in a user interface such as the user interface 400.

Further data is requested on specific performance groups (516). The purchaser may be viewing the provided performance group data responsive to the search at the client device 102. The purchaser may further desire to receive additional data about one or more of the listed performance groups. For example, the purchaser may wish to compare the click-through rates for various advertising verticals or categories of two or more performance groups. The purchaser may request the additional data using the interface 400, for example.

The requested data is generated (517). The performance group data server 130 may receive the request for additional data. The performance group data server 130 may retrieve the data and send it to the client device 102.

The requested data is displayed (518). The client device 102 may receive the requested additional data and display it in the user interface 400.

A bid or purchasing decision is made (520). The purchaser may use the provided data to make a purchasing decision regarding one or more of the displayed user performance groups using the client device 102. In some implementations, the purchaser may place a bid on the desired performance groups. If the purchaser is the highest bidder at the end of the performance group auction, then the purchaser may receive the desired performance group. In other implementations, the purchaser may purchase the desired performance groups directly from a seller, for example.

The performance group data is updated to reflect a bid or purchasing decision (525). The client device 102 may send the purchasing decision to the performance group data server 130. The performance group data server 130 may update the status of the performance groups to reflect the bid made, or purchase, of the performance groups.

Figure 6:
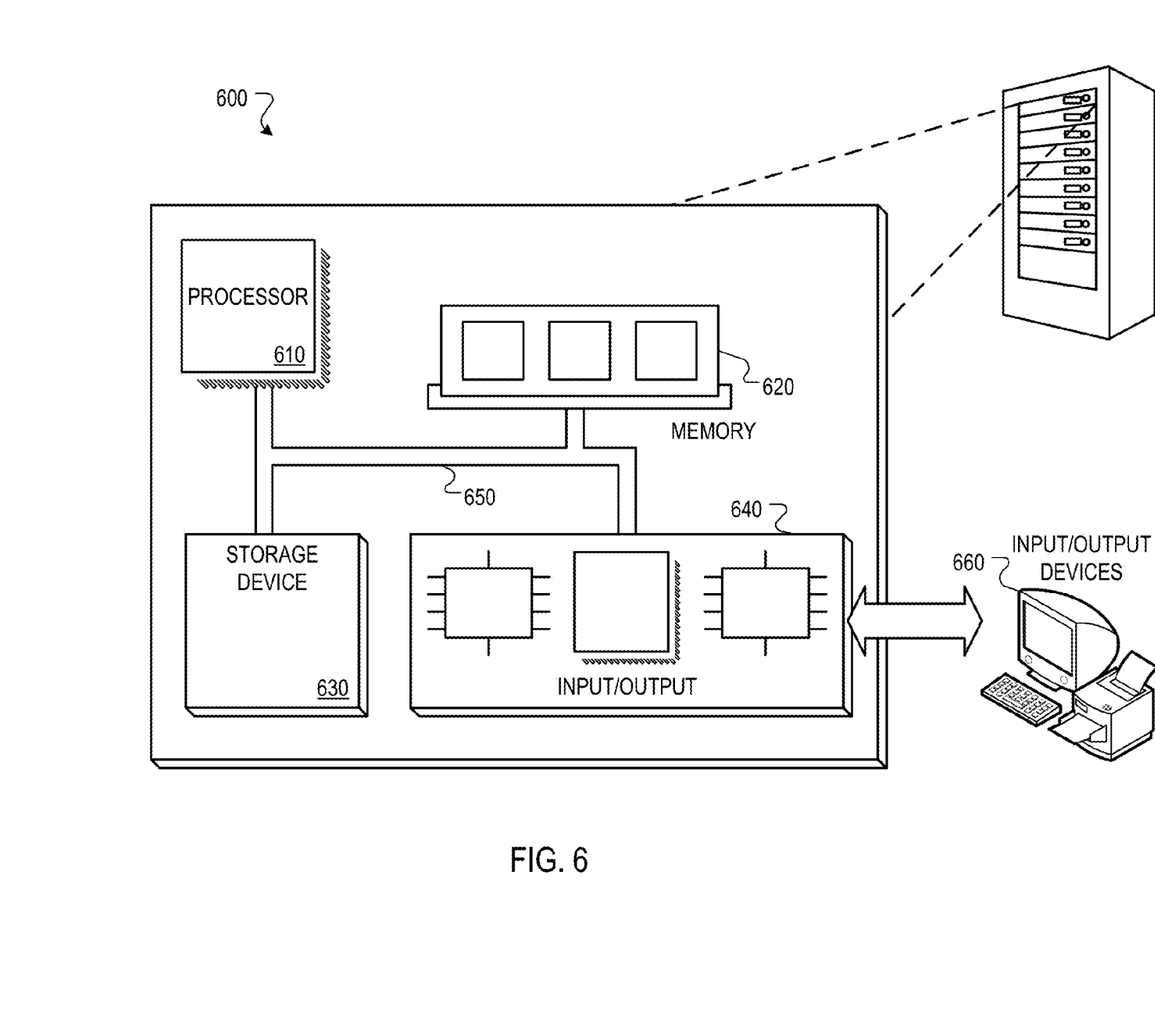
FIG. 6 is a block diagram of an example computer system that can be utilized to implement the systems and methods described herein.

FIG. 6 is a block diagram of an example computer system 600 that can be utilized to implement the systems and methods described herein. The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method performed by data processing apparatus, the method comprising:
   receiving a query that specifies desired user data for user pages in a social networking system and desired performance data for the user pages in the social networking system, the desired performance data describing a desired performance of advertisements when the advertisements are displayed on the user pages in the social networking system;
   querying social networking system data for user pages in a social networking system responsive to the query, the querying including evaluating profiles of a given user page as against the query; and
   receiving a performance group from the social networking system data, the performance group identifying user pages of the social networking system responsive to the query and comprising performance data of the user pages responsive to the query, the performance data of each user page specifying an advertisement performance for advertisements when the advertisements are displayed on the user page, the identified user pages being user pages that have:
      a profile having data that matches the desired user data; and
      an advertisement performance that satisfies the desired performance of advertisements specified by the query.

2. The method of claim 1, wherein the desired performance data describes desired performance of advertisements categorized in a particular category when the advertisements are displayed on the user pages in the social networking system.

3. The method of claim 1, further comprising:
   monitoring performance of a set of advertisements when the advertisements of the set are displayed on user pages identified by the performance group; and
   generating statistics for the performance group, the statistics describing the performance of the set of advertisements when advertisements of the set are displayed on user pages identified by the performance group.

4. The method of claim 1, further comprising:
   receiving data specifying a particular advertisement for display on user pages identified by the performance group;
   associating the particular advertisement with the performance group; and
   providing the particular advertisement for display on a user page identified by the performance group in response to the user page being displayed.

5. The method of claim 1, further comprising:
   determining that a user associated with a user page identified by the performance group has requested a particular user page that is not identified by the performance group; and
   providing an advertisement associated with the performance group for display on the particular user page in response to determining that the user associated with the user page identified by the performance group has requested the particular user page.

6. The method of claim 1, further comprising:
   associating the performance group with a first advertiser from which the query was received; and
   facilitating a sell of the performance group from the first advertiser to a second advertiser different than the first advertiser.

7. The method of claim 6, further comprising:
   receiving, from the second advertiser, data specifying one or more advertisements for display on user pages identified by the performance group; and
   providing the one or more advertisements for display on a user page identified by the performance group in response to the user page being displayed.

8. The method of claim 6, wherein facilitating a sell of the performance group comprises:
   receiving, from the second advertiser, a bid for the performance group; and
   selling the performance group to the second advertiser based on the bid.

9. The method of claim 6, further comprising:
   receiving a performance group query specifying attributes of a desired performance group;
   querying a set of performance groups based on the received performance group query;
   providing data identifying a proper subset of the performance groups responsive to the performance group query, the proper subset including the performance group; and
   receiving data specifying a selection of the performance group.

10. A system, comprising:
    a data processing apparatus; and
    a memory storage apparatus in data communication with the data processing apparatus, the memory storage apparatus storing instructions executable by the data processing apparatus and that upon such execution cause the data processing apparatus to perform operations comprising:
      receiving a query that specifies desired user data for user pages in a social networking system and desired performance data for the user pages in the social networking system, the desired performance data describing a desired performance of advertisements when the advertisements are displayed on the user pages in the social networking system;
      querying social networking system data for user pages in a social networking system responsive to the query, the querying including evaluating profiles of a given user page as against the query; and
      receiving a performance group from the social networking system data, the performance group identifying user pages of the social networking system responsive to the query and comprising performance data of the user pages responsive to the query, the performance data of each user page specifying an advertisement performance for advertisements when the advertisements are displayed on the user page, the identified user pages being user pages that have:
        a profile having data that matches the desired user data; and
        an advertisement performance that satisfies the desired performance of advertisements specified by the query.

11. The system of claim 10, wherein the desired performance data describes desired performance of advertisements categorized in a particular category when the advertisements are displayed on the user pages in the social networking system.

12. The system of claim 10, wherein the instructions upon such execution cause the data processing apparatus to perform further operations comprising:
    monitoring performance of a set of advertisements when the advertisements of the set are displayed on user pages identified by the performance group; and
    generating statistics for the performance group, the statistics describing the performance of the set of advertisements when advertisements of the set are displayed on user pages identified by the performance group.

13. The system of claim 10, wherein the instructions upon such execution cause the data processing apparatus to perform further operations comprising:
    receiving data specifying a particular advertisement for display on user pages identified by the performance group;
    associating the particular advertisement with the performance group; and
    providing the particular advertisement for display on a user page identified by the performance group in response to the user page being displayed.

14. The system of claim 10, wherein the instructions upon such execution cause the data processing apparatus to perform further operations comprising:
    determining that a user associated with a user page identified by the performance group has requested a particular user page that is not identified by the performance group; and
    providing an advertisement associated with the performance group for display on the particular user page in response to determining that the user associated with the user page identified by the performance group has requested the particular user page.

15. The system of claim 10, wherein the instructions upon such execution cause the data processing apparatus to perform further operations comprising:
    associating the performance group with a first advertiser from which the query was received; and
    facilitating a sell of the performance group from the first advertiser to a second advertiser different than the first advertiser.

16. The system of claim 15, wherein the instructions upon such execution cause the data processing apparatus to perform further operations comprising:
    receiving, from the second advertiser, data specifying one or more advertisements for display on user pages identified by the performance group; and
    providing the one or more advertisements for display on a user page identified by the performance group in response to the user page being displayed.

17. The system of claim 15, wherein facilitating a sell of the performance group comprises:
    receiving, from the second advertiser, a bid for the performance group; and selling the performance group to the second advertiser based on the bid.

18. The system of claim 15, wherein the instructions upon such execution cause the data processing apparatus to perform further operations comprising:

receiving a performance group query specifying attributes of a desired performance group;

querying a set of performance groups based on the received performance group query;

providing data identifying a proper subset of the performance groups responsive to the performance group query, the proper subset including the performance group; and receiving data specifying a selection of the performance group.

19. A non-transitory computer storage medium encoded with a computer program, the program comprising instructions that when executed by a data processing apparatus cause the data processing apparatus to perform operations comprising:

receiving a query that specifies desired user data for user pages in a social networking system and desired performance data for the user pages in the social networking system, the desired performance data describing a desired performance of advertisements when the advertisements are displayed on the user pages in the social networking system;

querying social networking system data for user pages in a social networking system responsive to the query, the querying including evaluating profiles of a given user page as against the query; and receiving a performance group from the social networking system data, the performance group identifying user pages of the social networking system responsive to the query and comprising performance data of the user pages responsive to the query, the performance data of each user page specifying an advertisement performance for advertisements when the advertisements are displayed on the user page, the identified user pages being user pages that have:

a profile having data that matches the desired user data; and an advertisement performance that satisfies the desired performance of advertisements specified by the query.

20. The non-transitory computer storage medium of claim 19, wherein the instructions upon such execution cause the data processing apparatus to perform further operations comprising:

monitoring performance of a set of advertisements when the advertisements of the set are displayed on user pages identified by the performance group; and generating statistics for the performance group, the statistics describing the performance of the set of advertisements when advertisements of the set are displayed on user pages identified by the performance group.

\* \* \* \* \*